(12) United States Patent
Klein (10) Patent No.: US 9,304,750 B2
(45) Date of Patent: Apr. 5, 2016

(54) SYSTEM AND METHOD FOR PROCESSOR WITH PREDICTIVE MEMORY RETRIEVAL ASSIST

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 936 days.

(21) Appl. No.: 12/685,477

(22) Filed: Jan. 11, 2010

(65) Prior Publication Data

US 2010/0115221 A1    May 6, 2010

Related U.S. Application Data

(63) Continuation of application No. 12/361,400, filed on Jan. 28, 2009, now Pat. No. 7,657,723, which is a continuation of application No. 11/240,099, filed on Sep. 30, 2005, now Pat. No. 7,490,210, which is a continuation of application No. 10/192,957, filed on Jul. 11, 2002, now Pat. No. 6,954,836.

(51) Int. Cl.
| | |
|---|---|
| G06F 12/00 | (2006.01) |
| G06F 9/38 | (2006.01) |
| G06F 9/45 | (2006.01) |
| G06F 12/02 | (2006.01) |

(52) U.S. Cl.
CPC ............ *G06F 8/445* (2013.01); *G06F 12/0215* (2013.01)

(58) Field of Classification Search
CPC ............ G06F 13/1615; G06F 12/0215; G06F 12/0855; G06F 9/3867; G06F 8/445; G06F 2207/3884

USPC .......... 711/169, E12.001; 712/225, 234, 239, 712/E09.016, E09.045; 717/106, 138–141
See application file for complete search history.

(56) References Cited

U.S. PATENT DOCUMENTS

| | | | |
|---|---|---|---|
| 4,205,370 A | 5/1980 | Hirtle | 364/200 |
| 4,734,852 A | 3/1988 | Johnson et al. | 364/200 |
| 4,763,245 A | 8/1988 | Emma et al. | 364/200 |
| 4,853,840 A | 8/1989 | Shibuya | 364/200 |

(Continued)

OTHER PUBLICATIONS

Jacob B.L. et al., "A Look at Several Memory Management Units, TLB-Refill Mechanisms, and Page Table Organizations", University of Maryland, University of Michigan, ACM, 1998. pp. 295-306.

(Continued)

*Primary Examiner* — Jasmine Song
(74) *Attorney, Agent, or Firm* — Dorsey & Whitney LLP (57) ABSTRACT

A system and method are described for a memory management processor which, using a table of reference addresses embedded in the object code, can open the appropriate memory pages to expedite the retrieval of information from memory referenced by instructions in the execution pipeline. A suitable compiler parses the source code and collects references to branch addresses, calls to other routines, or data references, and creates reference tables listing the addresses for these references at the beginning of each routine. These tables are received by the memory management processor as the instructions of the routine are beginning to be loaded into the execution pipeline, so that the memory management processor can begin opening memory pages where the referenced information is stored. Opening the memory pages where the referenced information is located before the instructions reach the instruction processor helps lessen memory latency delays which can greatly impede processing performance.

37 Claims, 7 Drawing Sheets

(56) References Cited

U.S. PATENT DOCUMENTS

| | | | |
|---|---|---|---|
| 4,984,154 A | 1/1991 | Hanatani et al. | 364/200 |
| 5,201,039 A | 4/1993 | Sakamura | 395/375 |
| 5,327,562 A | 7/1994 | Adcock | 395/700 |
| 5,339,431 A | 8/1994 | Rupp et al. | 395/700 |
| 5,367,703 A | 11/1994 | Levitan | 395/800 |
| 5,381,548 A | 1/1995 | Matsuo | 395/700 |
| 5,442,756 A | 8/1995 | Grochowski et al. | |
| 5,454,117 A | 9/1995 | Puziol et al. | 395/800 |
| 5,528,750 A | 6/1996 | Lubart et al. | 395/182.13 |
| 5,588,137 A | 12/1996 | Yoneda et al. | 395/490 |
| 5,659,752 A | 8/1997 | Heisch et al. | 395/704 |
| 5,659,753 A | 8/1997 | Murphy et al. | 395/705 |
| 5,671,416 A | 9/1997 | Elson | |
| 5,680,622 A | 10/1997 | Even | |
| 5,701,490 A | 12/1997 | Safonov | 395/705 |
| 5,836,014 A | 11/1998 | Faiman, Jr. | 395/707 |
| 5,848,269 A | 12/1998 | Hara | 395/586 |
| 5,875,325 A | 2/1999 | Talcott | 395/587 |
| 5,920,722 A | 7/1999 | Damron | 395/706 |
| 5,935,241 A | 8/1999 | Shiell et al. | 712/240 |
| 5,978,587 A | 11/1999 | Baisley et al. | 395/708 |
| 6,016,547 A | 1/2000 | Ono | 713/300 |
| 6,047,362 A | 4/2000 | Zucker | |
| 6,049,667 A | 4/2000 | Bates | 395/705 |
| 6,081,887 A | 6/2000 | Steely, Jr. et al. | 712/239 |
| 6,094,729 A | 7/2000 | Mann | 714/25 |
| 6,199,202 B1 | 3/2001 | Coutant et al. | |
| 6,292,866 B1 | 9/2001 | Zaiki et al. | 710/264 |
| 6,292,934 B1 | 9/2001 | Davidson et al. | 717/4 |
| 6,317,872 B1 | 11/2001 | Gee et al. | 717/7 |
| 6,351,848 B1 | 2/2002 | Chessin | 717/5 |
| 6,457,174 B1 | 9/2002 | Kuroda et al. | 717/162 |
| 6,463,523 B1 | 10/2002 | Kessler et al. | 712/216 |
| 6,467,035 B2 | 10/2002 | Tate et al. | 711/168 |
| 6,490,658 B1 | 12/2002 | Ahmed et al. | 711/140 |
| RE38,104 E | 4/2003 | Gosling | 717/140 |
| 6,564,313 B1 | 5/2003 | Kashyap | 712/207 |
| 6,678,817 B1 | 1/2004 | Dua et al. | 712/205 |
| 6,697,971 B1 * | 2/2004 | Dwyer | 714/54 |
| 6,704,858 B1 | 3/2004 | Sugimoto | 712/228 |
| 6,766,443 B2 | 7/2004 | Sinharoy | 712/239 |
| 6,807,548 B1 | 10/2004 | Kemper | 707/103 R |
| 6,823,446 B1 | 11/2004 | Sinharoy | 712/239 |
| 6,907,520 B2 | 6/2005 | Parady | 712/228 |
| 6,931,504 B2 | 8/2005 | Wolczko et al. | 711/165 |
| 6,954,836 B2 | 10/2005 | Klein | 711/169 |
| 7,024,663 B2 | 4/2006 | Klein | 717/127 |
| 7,152,229 B2 | 12/2006 | Chong et al. | 717/146 |
| 7,165,169 B2 | 1/2007 | Henry et al. | 712/240 |
| 7,203,925 B1 | 4/2007 | Michael et al. | |
| 7,490,210 B2 | 2/2009 | Klein | 711/169 |
| 7,657,723 B2 | 2/2010 | Klein | 711/169 |
| 2002/0091915 A1 | 7/2002 | Parady | 712/225 |
| 2002/0194464 A1 | 12/2002 | Henry et al. | 712/239 |
| 2002/0194465 A1 | 12/2002 | Sinharoy | 712/239 |
| 2003/0159128 A1 | 8/2003 | Kunzler | |
| 2004/0010777 A1 | 1/2004 | Klein | 717/127 |
| 2006/0031822 A1 | 2/2006 | Klein | 717/140 |
| 2006/0130023 A1 | 6/2006 | Klein | 717/140 |
| 2011/0055527 A1 | 3/2011 | Klein | |

OTHER PUBLICATIONS

Jong, G. et al., "Background Memory Management for Dynamic Data Structure Intensive Processing Systems", IEEE, 1995. pp. 515-520.

Appel, Andrew W. et al., "Virtual Memory Primitives for User Programs", [Online], ACM 1991, pp. 96-107, [Retrieved from Internet on Jun. 9, 2015], <https://delivery.acm.org/10.1145/110000/106984/p96-appel.pdf>.

Davidson, Jack et al., "Code Selection through Object Code Optimization", [Online], Nov. 1984, pp. 505-526, [Retrieved from Internet on Feb. 6, 2013], <http://citeseerx.ist.psu.edu/viewdoc/download?doi=10.1.1.140.2150&rep=rep1&type=pdf>.

Egger, Bernhard et al., "Scratchpad Memory Management for Portable Systems with a Memory Management Unit", [Online], 2006, pp. 321-330, [Retrieved from Internet on Jun. 9, 2015], <http://delivery.acm.org/10.1145/1180000/1176933/p321-egger.pdf>.

Gao, Hongliang et al., "Address-Branch Correlation: A Novel Locality for Long-Latency Hard-to-Predict Branches", [Onlin], IEEE 2008, pp. 74-85, [Retrieved from Internet on Feb. 6, 2013], <http://www.eecs.ucf.edu/~zhou/hpca08_ieee.pfd>.

Jimenez, Daniel, "Code Placement for Improving Dynamic Branch Prediction Accuracy", [Online], ACM 2005, pp. 1-10, [Retrieved from Internet on Feb. 6, 2013], <http://pdf.aminer.org/000/542/659/code_placement_for_improving_dynamic_branch_prediction_accuracy.pdf>.

Milenkovic, Milena et al., "Using Instruction Block Signatures to Counter Code Injection Attacks", ACM SIGARCH Computer Architecture News, vol. 33, No. 1, Mar. 2005

Teller, Patricia J., "Translation-Lookaside Buffer Consistency", [Online], IEEE 1990, pp. 26-36, [Retrieved from Internet on Jun. 9, 2015], <https://cs.uwaterloo.ca/~brecht/courses/702/Possible-Readings/multiprocessor/tlb-consistency-computer-1990.pdf>.

* cited by examiner

SYSTEM AND METHOD FOR PROCESSOR WITH PREDICTIVE MEMORY RETRIEVAL ASSIST

CROSS-REFERENCE TO RELATED APPLICATIONS

This application is a continuation of U.S. patent application Ser. No. 12/361,400, filed Jan. 28, 2009, which is a continuation of U.S. patent application Ser. No. 11/240,099 filed Sep. 30, 2005, U.S. Pat. No. 7,490,210, which is a continuation of U.S. patent application Ser. No. 10/192,957, filed Jul. 11, 2002, U.S. Pat. No. 6,954,836. These applications and patents are incorporated by reference herein in their entirety and for all purposes.

TECHNICAL FIELD

The present invention relates to computer processors. More specifically, the present invention relates to a system and method for processing compiled object code to help reduce memory latency-related delays and, therefore, improve the speed with which the object code can be processed.

BACKGROUND OF THE INVENTION

As processors become ever faster, increasingly the bottleneck restricting processing throughput is the speed—or lack thereof—of computer memory in responding to processor directives. This "memory latency" is a very serious problem, because processors process instructions and data much faster than these instructions and data can be retrieved from memory. Today, the speed with which microprocessors can process instructions commonly is rated in gigahertz. Unfortunately, overall system performance is hamstrung by motherboards operating between one hundred and three hundred megahertz, i.e., almost an order of magnitude slower.

To make matters worse, the disparity between the speed of processor clocks and memory clocks is growing. Currently, the ratio of processor clock speed to memory clock speed typically is 8:1, but that ratio is predicted to increase to 100:1 in the next few years. Compounding the problem is the fact that a memory system may require ten or more of its own memory clock cycles to respond to a memory retrieval request, thus, the ratio for a complete memory cycle is far worse. Today, completion of one full memory cycle may result in the waste of hundreds of processing cycles. In the near future, based on current performance trends in microprocessors, completion of a memory cycle may result in the waste of thousands of processing cycles.

To help reduce delays caused by memory latency, processors incorporate an execution pipeline. In the execution pipeline, a sequence of instructions to be executed are queued to avoid the interminable memory retrieval delays that would result if each instruction were retrieved from memory one at a time. However, if the wrong instructions and/or data have been loaded into the pipeline, the processor will fall idle while the wrong instructions are cleared and replaced with the correct instructions.

Figure 1:
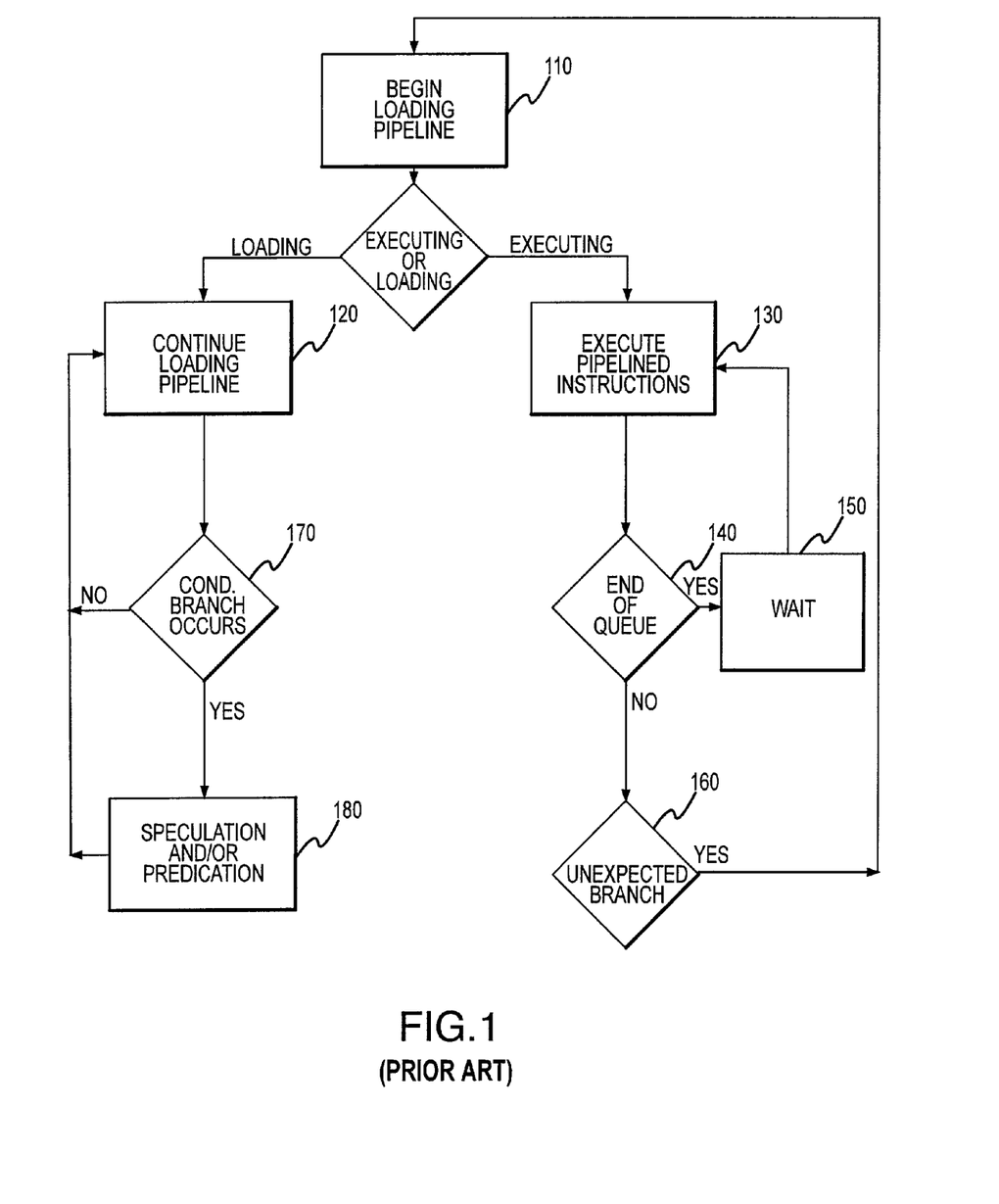
FIG. 1 is a flowchart showing the typical operation of a processor executing a conventionally compiled program.

FIG. 1 is a flowchart illustrating these problems and some of the solutions. To expedite processing, once a program or routine is initiated, at 110 instructions are queued in the execution pipeline, and the processor begins to execute the queued instructions at 130. The processor continues executing instructions from the pipeline until one of two things happens. If the processor reaches the end of the queued instructions at 140, the processor will wait idle at 150 until the next instructions are queued, then resume executing queued instructions at 130. In this instance, memory pages storing the next instructions may be in the process of being opened to transfer their contents to the execution pipeline, so the memory latency delay may not be too lengthy.

Figure 2A:
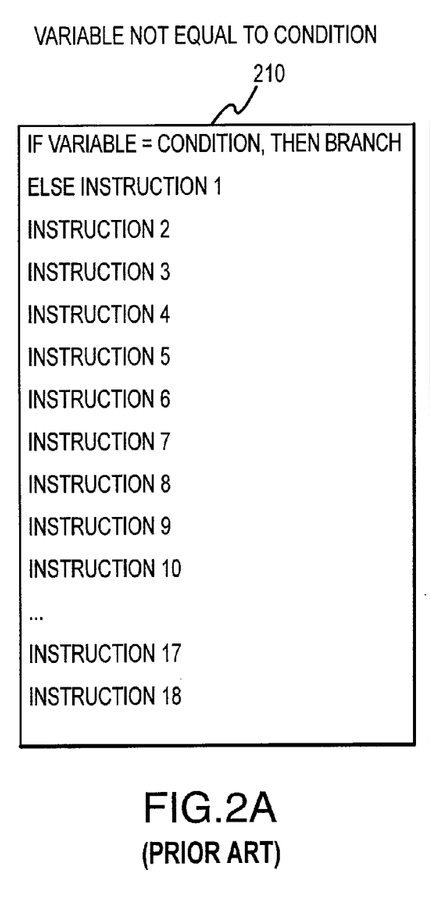
FIG. 2A is a representation of instructions in an execution pipeline to be executed by a processor in a conventionally compiled program when no branch is taken or when speculation as to which branch will be followed is correct.
Figure 2B:
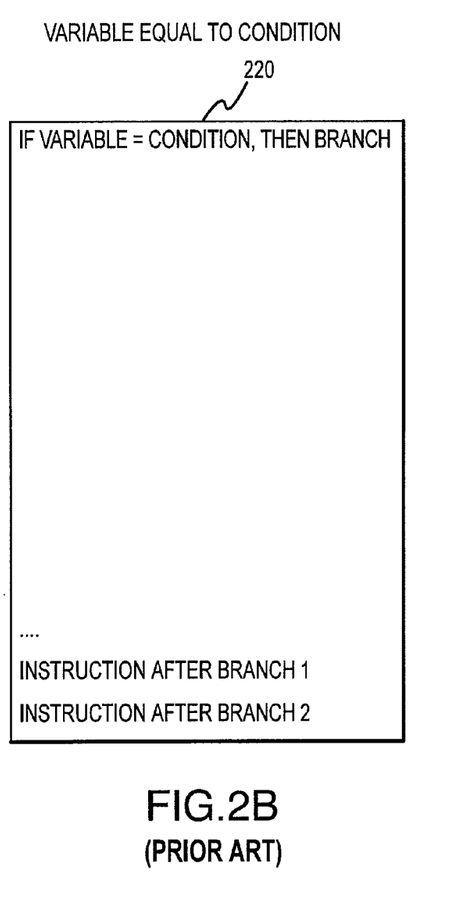
FIG. 2B is a representation of the instructions in an execution pipeline to be executed by a processor in a conventionally compiled program when an unexpected branch is taken or when speculation as to which branch will be followed is incorrect.

If the processor has not reached the end of the instructions queued in the execution pipeline, delays still may result when conditional branch instructions are encountered. A typical CPU may sequentially load a range of instructions from memory in the order they appear, ignoring the possibility that a conditional branch instruction in that range could redirect processing to a different set of instructions. FIGS. 2A and 2B represent two situations in which instructions were loaded into the execution pipelines 210 and 220, respectively, making the assumption that the conditional branch would not be taken, and queuing the instructions following the conditional branch instruction in the execution pipelines 210 and 220. In both FIGS. 2A and 2B, the conditional branch will be taken if "VARIABLE" is equal to CONDITION."

In the situation depicted in FIG. 2A, it is assumed that VARIABLE is not equal to CONDITION. Therefore, the conditional branch is not taken. As a result, the next instructions that should be processed are those immediately following the conditional branch instruction. Thus, as it turns out, queuing the instructions following the conditional branch was the correct course of action, and the processor can continue processing the next instructions in the execution pipeline without delay, as though the conditional branch instruction did not exist.

On the other hand, FIG. 2B depicts the situation if VARIABLE is equal to CONDITION, indicating the branch should be taken. Because the execution pipeline had been loaded with instructions on the assumption that the conditional branch would not be followed, this is considered to be an unexpected branch 160 (FIG. 1). Because the condition is met and the branch must be taken, then the instructions following the conditional branch, which were queued as they were in the execution pipeline 210 in FIG. 2A, will not be processed. Accordingly, the execution pipeline 220 must be cleared as shown in FIG. 2B, and the processor will fall idle while the execution pipeline is reloaded. Having to reload the execution pipeline 220 as shown in FIG. 2B is comparable to the situation if the execution pipeline had not been loaded with any instructions beyond the conditional branch instruction. Thus, the entire queuing process begins anew at 110 (FIG. 1) with the processor waiting for a full memory retrieval cycle to get the next instruction, "INSTRUCTION AFTER BRANCH 1," which eventually is loaded into the pipeline at 230.

The taking of an unexpected branch 160 may result in a significantly longer processor idle interval than the processor reaching the end of the queued instructions at 150. If the processor reaches the end of the queued instructions, the next needed instructions may be in the process of being fetched to the execution pipeline. If the instructions are in the process of being retrieved, only a few processor cycles might remain before the instructions reach the execution pipeline. However, if an unexpected branch is taken as at 160, the retrieval of the next instructions starts anew, and hundreds of processor cycles might pass before the next instructions reach the execution pipeline.

To avoid processing delays resulting from unexpected branching, techniques such as branch speculation and prediction have been devised. With reference to FIG. 1, speculation and/or prediction 180 occurs once a conditional branch instruction like "IF VARIABLE=CONDITION" has been encountered at 170. Using speculation or speculative branching, instructions queued in the pipeline are previewed. If an instruction comprises a conditional branch, the system speculates as to the outcome of the branch condition, and loads in the execution pipeline instructions and data from the predicted branch. Speculation renders an educated guess by attempting to precalculate the key variable to project the likelihood the branch is taken, and instructions from the more or most likely branch are queued for processing.

If the correct educated guess is made, the effect is the same as if the instructions in sequence were loaded ignoring any possible branches, as shown in FIG. 2A, and the processor can continue processing without having to wait for new instructions to be retrieved. However, if the speculation incorrectly predicts the branch, incorrect and unusable instructions will have been loaded in the pipeline, and the effect is the same as illustrated in FIG. 2B. The processor will, therefore, fall idle while instructions in the pipeline are cleared and replaced with the instructions from the branch actually followed. In sum, speculation can avoid wasted processing cycles, but only if the speculation routine guesses correctly as to what branch will be followed.

Prediction is a technique which exploits multiscalar or superscalar processors. A multiscalar processor includes multiple functional units which provides independent execution slots to simultaneously and independently process different, short word instructions. Using prediction, a multiscalar processor can simultaneously execute both eventualities of an IF-THEN-ELSE-type instruction, making the outcome of each available without having to wait the time required for the sequential execution of both eventualities. Based on the parallel processing of instructions, the execution pipeline can be kept filled for more than one branch possibility. "Very Long Instruction Word" processing methodologies, such as Expressly Parallel Instruction Computing ("EPIC") devised by Intel and Hewlett-Packard, are designed to take advantage of multiscalar processors in this manner. The EPIC methodology relies on the compiler to detect such potential parallelism and generated object code to exploit multiscalar processing.

Figure 2C:
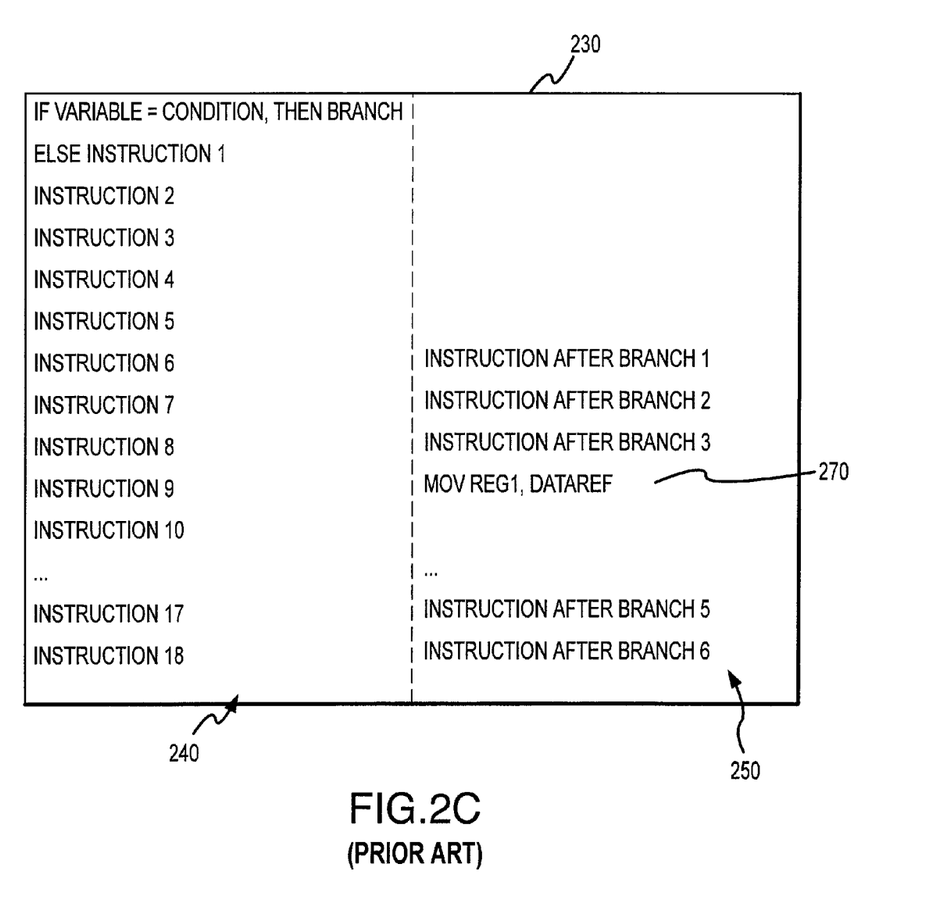
FIG. 2C is a representation of the instructions in an execution pipeline to be executed by a multiscalar or superscalar processor in a conventionally compiled program when prediction is employed to process two different possible branches in parallel.

FIG. 2C depicts a scenario in which a microprocessor with two functional units processes instructions in two execution slots in parallel. Upon encountering the same conditional branch instruction as seen in FIGS. 2A and 2B, the width of the execution 230 pipeline allows it to be partitioned into a first execution slot 240 and a second execution slot 250, each of which is loaded with instructions conditioned on each possibility. The first execution slot 240 is loaded with instructions responsive to the possibility that "VARIABLE" is not equal to "CONDITION" and the branch is not taken, and the second execution slot 250 with instructions responsive to the possibility that "VARIABLE=CONDITION" and the branch is taken. Both of these sets of instructions can be loaded and executed in parallel. As a result, no processing cycles are lost in having to reload the pipeline if an unexpected branch is not taken.

Prediction, too, has many limitations. Of course, if available processing parallelism is not detected, prediction simply will not be used. In addition, if the instructions are long word instructions such that a single instruction consumes all of the available functional units, there can be no parallel processing, and, thus, no prediction. Alternatively, because a string of conditional branches potentially can invoke many different possible branches, the possibility remains that instructions might be loaded into the execution pipeline for an incorrect branch. In such a case, the result would be that as illustrated in FIG. 2B, where the pipeline must be emptied and reloaded while the processor falls idle.

In sum, the object of branch speculation, and/or prediction is to avoid wasting processor by filling the execution pipeline with instructions are most likely to be needed as a result of a conditional branch or with parallel sets instructions to allow for multiple conditional branch outcomes, respectively. However, even if speculation or prediction help to fill the execution pipeline with the appropriate instructions, those instructions might invoke other branches, routine calls, or data references, which may not be resolved until the processor actually processes the instruction. This would result in memory latency delays even when branch speculation or prediction work as intended.

For example, referring to FIG. 2C, the empty lines in execution slot 250 represent the time lost as a result of the reference to "BRANCH" in the first execution slot. Although instructions can continue to be loaded into execution slot 240, the memory page where "BRANCH" is stored must be opened before the instructions at that address can be retrieved into the pipeline. Similarly, instruction 270 calls for data to be retrieved from memory and moved into a register. Empty spaces in the execution slot 250 represent the delay which results while the memory page where "dataref" is stored is opened. Once again, the processor would fall idle during the many cycles required to retrieve the referenced information from memory.

Cache memory may avoid some of these delays by reducing the time required to retrieve information from memory by transferring portions of the contents of memory into fast memory devices disposed on the microprocessor itself (level one cache) or directly coupled to the microprocessor (level two cache). Typically, the processor can retrieve data from level two cache usually in half the time it can retrieve data from main memory, and in one-third or even one-sixth the time it would take to retrieve the same data from main memory. When a processor calls for instructions or data from memory, other information stored nearby in memory also are transferred to cache memory because it is very common for a large percentage of the work done by a particular program or routine to be performed by programming loops manifested in localized groups of instructions.

However, the use of cache memory does not completely solve the memory latency problem. Unless the desired data happens to be present in cache, the presence of cache memory saves no time at all. Cache memory has only a small fraction of the capacity of main memory, therefore, it can store only a fraction of the data stored in main memory. Should the processor call for data beyond the limited range of data transferred to cache, the data will have to be retrieved from memory, again leaving the processor idle for tens or hundreds of cycles while the relevant memory pages are fetched.

What is needed is a way to help expedite the retrieval of memory pages from memory into the execution pipeline to avoid or reduce memory latency delays. It is to improving this process that the present invention is directed.

SUMMARY OF THE INVENTION

One aspect of the invention provides a method for processing programming instructions by an instruction processor. The method includes loading a reference table having at least one reference and an associated memory address. The reference table is associated with a group of programming instructions. The method further includes identifying programming instructions of the group having invocation of a reference in the reference table. Prior to processing a programming instruction having an invocation, retrieval of information corresponding to the respective associated memory address is initiated in response to identifying the invocation. The programming instruction having the invocation is then processed.

Another aspect of the invention provides a method for retrieving data referenced by an address reference invoked by a programming instruction queued for execution in an execution pipeline from a memory system. The method includes receiving a reference table having an entry for a memory address corresponding to the address reference. The reference table is associated with a segment of programming instructions including the programming instruction invoking the address reference. The method further includes identifying the address reference in the execution pipeline and initiating retrieval of contents stored at the corresponding memory address.

Another aspect of the invention provides a method for retrieving information identified by address references invoked by programming instructions loaded in an instruction queue. The method includes receiving a reference table having entries for memory addresses corresponding to respective address references. Prior to processing, programming instructions loaded in the instruction queue are parsed for programming instructions invoking an address reference. In response to finding a programming instruction invoking an address reference, retrieval of the contents of the memory address entered in the reference table corresponding to the invoked address reference is initiated.

Another aspect of the invention provides a system for processing programming instructions. The system includes an execution pipeline cache operable to queue programming instructions and a memory controller operable to retrieve information corresponding to a memory address. The system further includes a memory management processor coupled to the execution pipeline cache and the memory controller. The memory management processor includes a reference table buffer operable to store a reference table having at least one reference and an associated memory address. The reference table is associated with a segment of programming instructions. The memory management processor is operable to identify programming instructions of the segment that are queued in the execution pipeline cache that have invocation of a reference in the reference table. The memory management processor is further operable to control the memory controller to initiate retrieval of information corresponding to the respective associated memory address in response to identifying the invocation prior to the processing of a programming instruction having an invocation. An instruction processor coupled to the execution pipeline cache and memory management processor is operable to process the programming instruction having the invocation.

DETAILED DESCRIPTION OF THE INVENTION

It should be noted that the preferred embodiment of a system and method of the present invention are equally applicable both to programs created high-level language source code and assembly language source code. Throughout this description, the term compiler will be used, but it can be taken to mean a compiler or an assembler. Similarly, while functional blocks of programming are referred to as routines, the term routines can be taken to mean routines, subroutines, procedures, or other similar programming segments.

Figure 3:
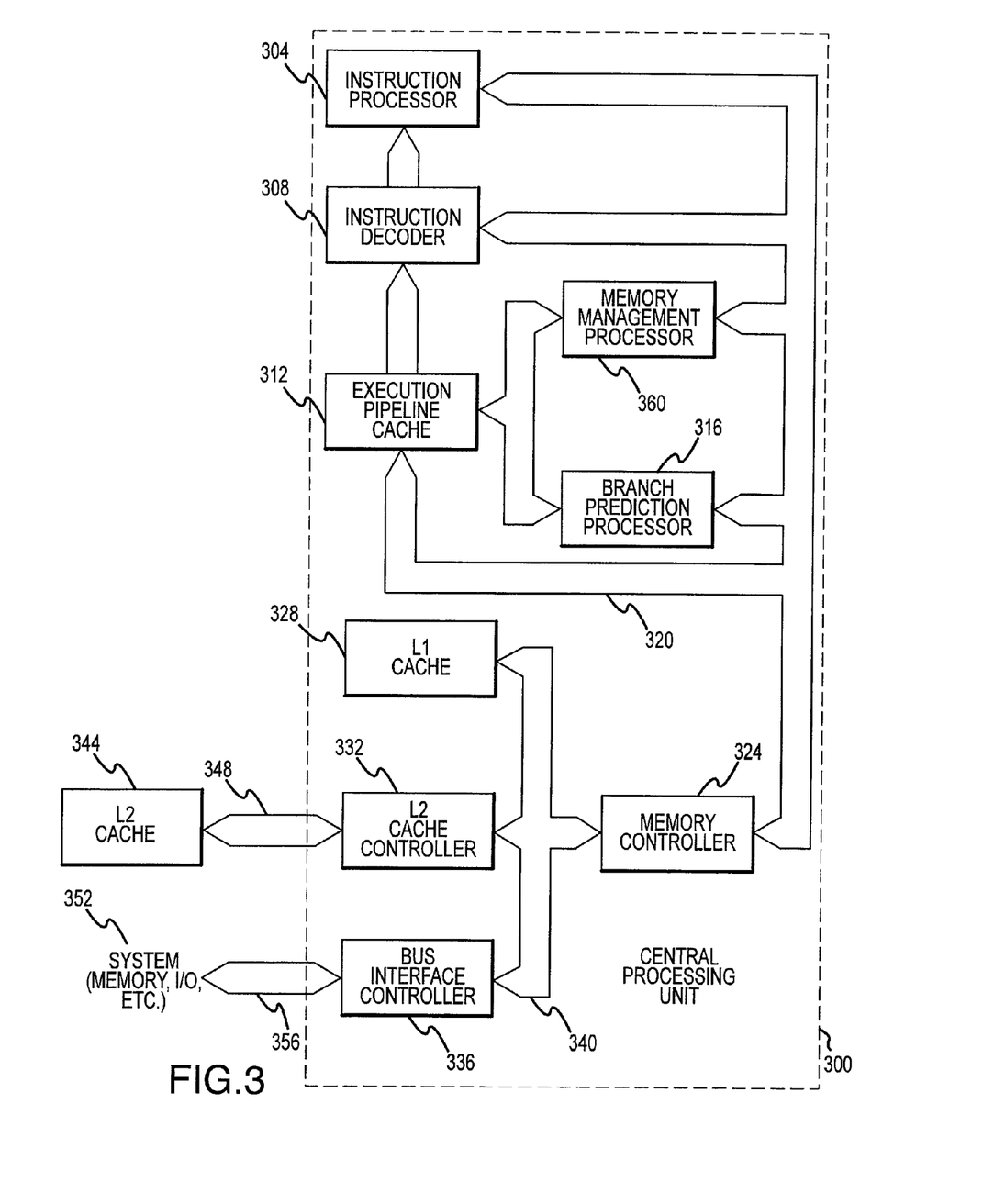
FIG. 3 is a block diagram of a processing system incorporating an embodiment of the present invention.

FIG. 3 illustrates an embodiment of the present invention manifested as part of a central processing unit 300. The conventional central processing unit 300 adapted to use an embodiment of the present includes an instruction processor 304 which processes instructions directed by an associated instruction decoder 308. The instruction decoder 308 decodes instructions queued in an execution pipeline cache 312. Associated with the central processing unit 300 may be a branch prediction processor 316. The instruction processor 304, the instruction decoder 308, the execution pipeline cache 312, and the branch prediction processor 316 are interconnected by an internal bus 320. As previously described, the branch prediction processor 316 is operable to review instructions in the execution pipeline cache 312 where it attempts to predetermine the result of conditional branch instructions by pre-calculating the conditions determining the branch. Based on its determination, the branch prediction processor 316 might communicate using the internal bus 320 with a memory controller 324 to direct retrieval of a different set of instructions than those appearing in sequence following a conditional branch instruction. Similarly, if the central processing unit 300 was a multiscalar processor, a prediction processor (not shown) might be coupled through the internal bus 320 to the same devices to direct multiple supply short word instructions be queued in parallel in the execution pipeline 312, and eventually processed in parallel by multiple functional units of the instruction processor 304.

When instructions or other information are sought by the instruction processor 304 or other devices, the requests are passed across the internal bus 320 to a memory controller 324. The memory controller 324 controls the operation of the on-board level 1 cache 328, the level 2 cache controller 332, and the bus interface controller 336 through an internal memory bus 340. The memory controller 324 receives requests for instructions or other data, and determines whether the requested information is resident in cache or whether it must be retrieved from elsewhere in the system 352. For information not resident in level 1 cache 328, if it is resident in level 2 cache 344, the level 2 cache controller retrieves it through a level 2 cache channel 348. For information not resident in either level 1 cache 328 or level 2 cache 344, the bus interface controller 336 seeks the requested information from the system 352 via the processor bus 356. It will be appreciated that the processor architecture depicted in FIG. 3 is just one example used for the sake of illustration. Myriad processor designs exist, and embodiments of the present invention can be adapted to use any number of such processor designs.

The central processing unit 300 includes an embodiment of the memory management processor 360 of the present invention. The memory management processor 360 is coupled with the execution pipeline 312 and the internal bus 320. So coupled, the memory management processor 360 can exploit a reference table contained within object code. The preparation of a suitable reference table is described in filed U.S. patent application Ser. No. 10/192,923 by Klein entitled "METHOD AND SYSTEM FOR GENERATING OBJECT CODE TO FACILITATE PREDICTIVE MEMORY RETRIEVAL." In a preferred embodiment, and as further described below, the reference table will be indicated by a signature which will signify to the memory controller 324 that the reference table should be routed to the memory management processor 360. In a preferred embodiment, the memory management processor 360 will incorporate a reference table buffer (not shown) to store reference tables as they are received via the internal bus 320. As the object code for new programs or new routines are received by the central processing unit 300, the memory controller 324 can route any new or additional reference tables to the memory management processor 360.

Figure 4:
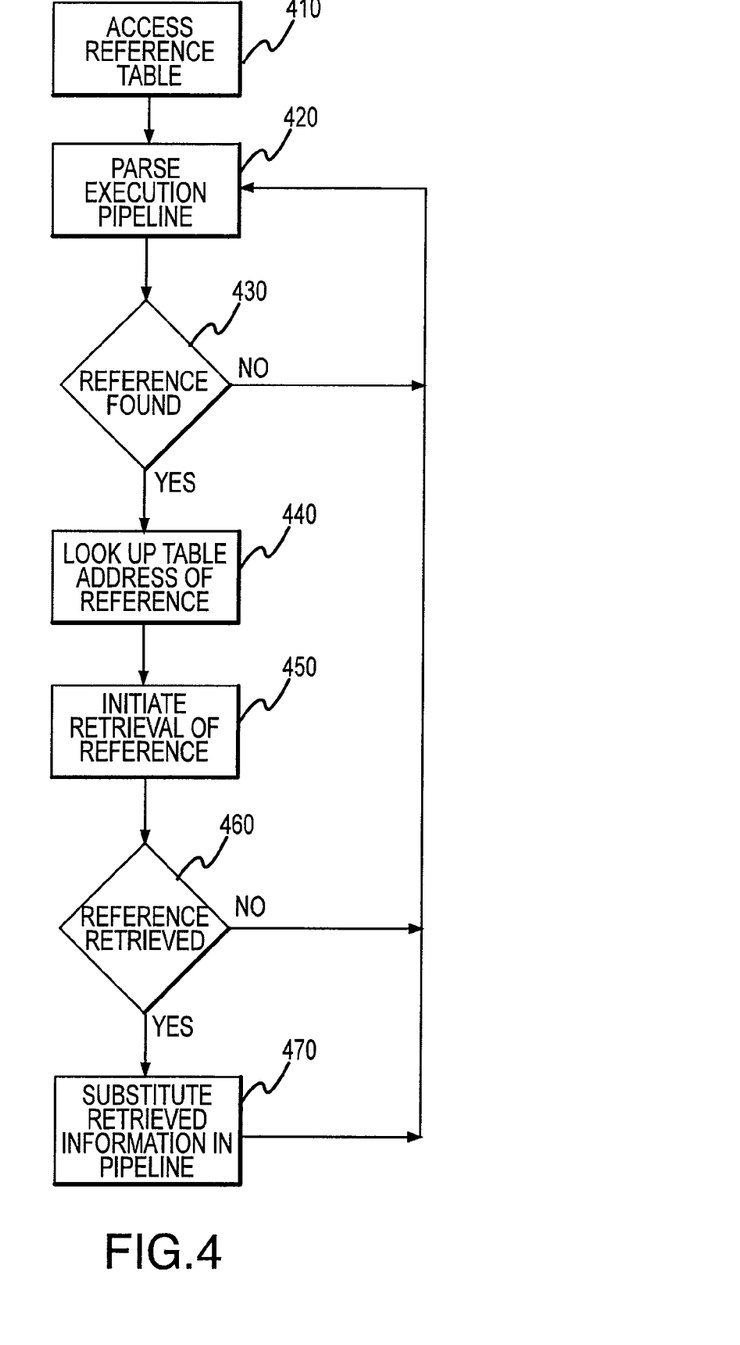
FIG. 4 is a flowchart showing the process followed by an embodiment of the present invention.

FIG. 4 flowcharts the operation of the memory management processor 360. After receiving or otherwise accessing the reference table at 410, the memory management processor 360 (FIG. 3) parses the execution pipeline 312 (FIG. 3) for instructions at 420 (FIG. 4). If the memory management processor 360 (FIG. 3) does not find an instruction invoking a reference included in the reference table, the memory management processor 360 continues parsing the execution pipeline 312 (FIG. 3) at 420 (FIG. 4). However, if the memory management processor 360 (FIG. 3) finds an instruction invoking a reference included in the reference table at 430 (FIG. 4), the memory management processor 360 (FIG. 3) will look up the address listed in the reference table for the reference at 440. The memory management processor 360 (FIG. 3) then will initiate opening of the memory location referenced at 450 (FIG. 4) by transmitting the address to the memory controller 324 (FIG. 3).

If no references have yet been retrieved, the memory management processor 360 (FIG. 3) resumes parsing the execution pipeline 312 at 420 (FIG. 4). On the other hand, if a reference has been retrieved from cache or memory at 460, the memory management processor 360 (FIG. 3) can direct the insertion of the retrieved references into the execution pipeline 312 at 470 (FIG. 4). For example, if a reference to a variable has been retrieved, the memory management processor 360 (FIG. 3) can substitute the value of the variable for the reference in the execution pipeline 312. Alternatively, if instructions from a routine invoked by an instruction in the pipeline have been retrieved, the memory management processor 360 can direct those instructions be inserted in the execution pipeline following the invoking instruction. This process repeats continually. If a new program or routine is accessed by the central processing unit 300 which includes a new reference table, the table will be accessed by the memory management processor 360 at 410 (FIG. 4) and the process described in FIG. 4 begins anew.

Returning to FIG. 3, if instructions queued in the execution pipeline 312 invoke references listed in the reference table, the memory management processor 360 initiates retrieval of reference information by signaling to the memory controller 324 to retrieve the contents stored at the address referenced. The memory controller 324 can then determine if the contents of the address are resident in level 1 cache 328, level 2 cache 344 as indicated by the level 2 cache controller 332, or must be retrieved from main memory or elsewhere in the system 352 via the bus interface controller 336. As a result, if the information sought already is in cache, the information need not be sought from main memory. It will be appreciated that the same contention checking used in prediction, caching, and similar processes can be applied in embodiments of the present invention to ensure that values changed in cache or memory after they have been transferred into the execution pipeline will be updated.

Figure 5:
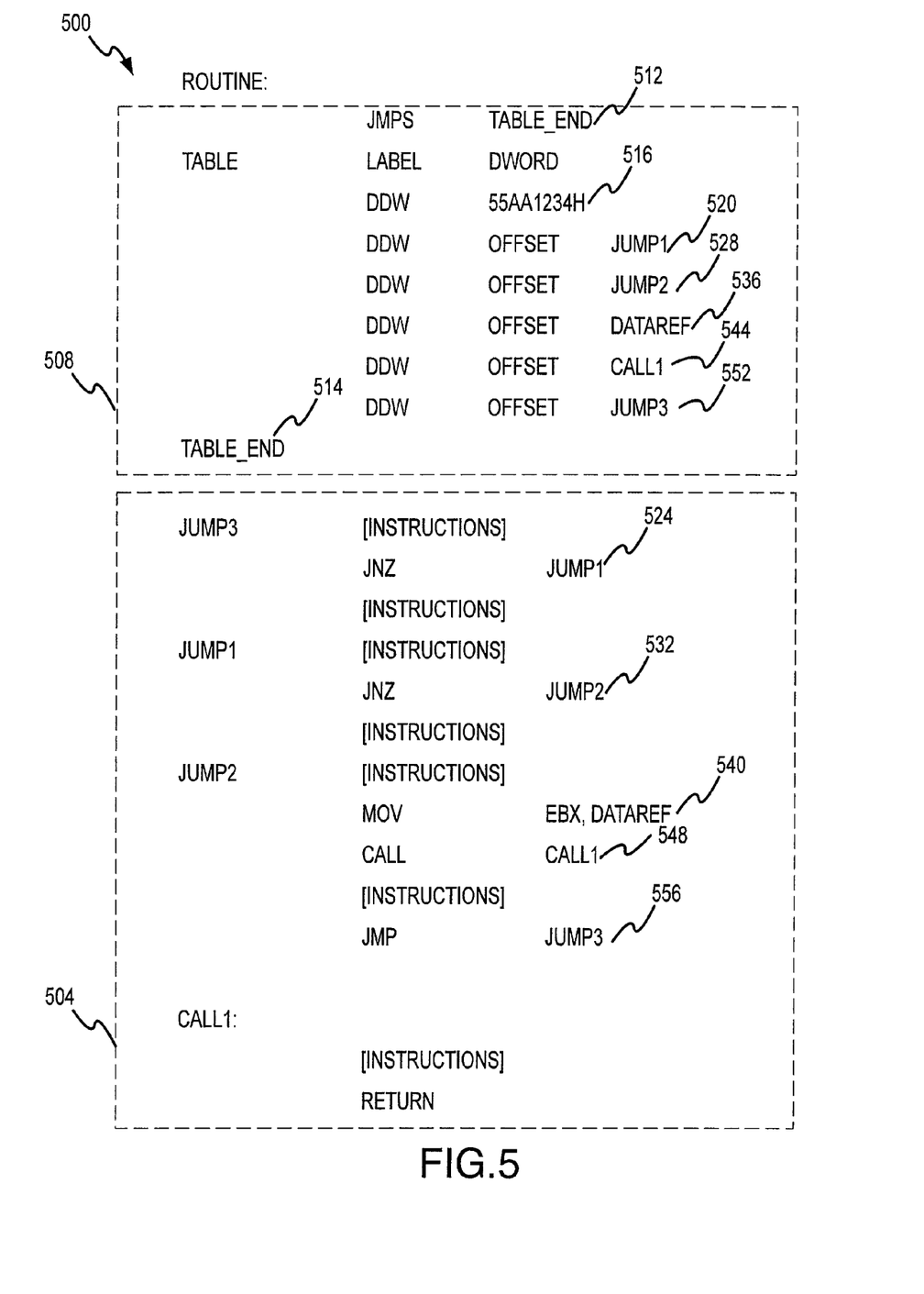
FIG. 5 is an excerpt of an assembly language representation of object code compiled or assembled using an embodiment of the present invention.

FIG. 5 shows an assembly language representation of object code for a routine 500 containing a reference table which can be exploited by embodiments of the present invention to lessen processing delays caused by memory latency. The routine 500 includes a sequence of instructions 504, which is conventional for a programming routine to include. Preceding the instructions 504, however, is a reference table 508 generated by a compiler or assembler directed to avoiding memory latency delays using an embodiment of the present invention. It should be noted that the table 508 begins with a jump instruction, "JUMPS TABLE_END" 512 which allows a computing system that is not equipped with an embodiment of the present invention to take advantage of this reference table 508 to skip to the end of the table 514. By directing a computing system not equipped to use the table 508 to the end of the table 514, the computing system is directed to where the instructions 504 begin, where a conventional computing system would start a conventional routine.

After the jump instruction 512, which is ignored by a computing system equipped with an embodiment of the present invention, a signature 516 identifies to an embodiment of the present invention that this is a suitable reference table 508. The first substantive entry in the reference table 520 is "DDW OFFSET JUMP1," which reserves a double data word at an offset position within the table for the reference JUMP1. JUMP1 is a reference invoked by a first conditional branch instruction 524 appearing in the instruction section 504 of the routine 500. This branch reference is identified by a compiler designed to take advantage of embodiments of the present invention. Accordingly, for the reference JUMP1 in the table 508, an address space a double data word in length is reserved in the table at 520. Similarly, the table entry 528 is to reserve in the table 508 a double data word address space for JUMP2, a reference invoked by a second conditional branch instruction 532 in the instructions 504. Appearing next in the table 508 is an entry 536 reserving a double data word address space for dataref, which is a data reference made by instruction 540. Next, table entry 544 reserves a double data word address space for CALL1, which is the address of a routine call invoked by CALL instruction 548. The last table entry 552 is a final double data word table entry for JUMP3, the address of a branch address invoked in the last conditional branch instruction 556.

There are three things to note about this table 508. First, the double data word designation appears because, in the system for which the routine 500 has been compiled, the system has an address range defined by an address a double data word in size. Second, the designation OFFSET signifies that the address to be entered is an offset address, not an absolute address. As is known in the art, the designation offset allows the program, as it is being loaded into memory, to resolve offset addresses relative to an initial address. As a result, this program can be loaded anywhere in the system's memory.

Third, this table 508 is what is stored in a reference table buffer in a memory management processor 360 (FIG. 3) and used to initiate retrieval of data referenced by instructions in the routine 500 (FIG. 5). When the routine 500 is being queued in the execution pipeline 312 (FIG. 3) for processing, the table 508 (FIG. 5) is provided to the memory management processor 360 (FIG. 3). Once the instructions 504 are loaded into the execution pipeline 312 (FIG. 3), the memory management processor 360 can parse the execution pipeline 312 looking for references listed in the table. Thus, for example, when the memory management processor 360 encounters in the execution pipeline 312 the first conditional branch instruction 524 (FIG. 5), the memory management processor 360 (FIG. 3) initiates retrieval of the instructions at the address listed in the resolved table entry 520 (FIG. 5) for the reference JUMP1. Then, if the instruction processor 304 (FIG. 3) conditional branch is taken at 532 (FIG. 5), the memory pages where the instructions at the branch JUMP1 are stored are in the process of being opened and their contents retrieved. Because these pages are already being opened, memory latency delays as a result of taking this conditional branch are reduced.

Similarly, for example, upon parsing the execution pipeline 312 (FIG. 3) and finding the instruction 540 (FIG. 5) referencing dataref, the memory management processor can initiate retrieval of data from memory at the address listed in the resolved table entry 536. Thus, when the instruction processor 304 (FIG. 3) reaches the instruction 540 (FIG. 5) invoking dataref, memory latency delays are reduced. The delay is reduced because, while the instruction processor 304 (FIG. 3) was executing the preceding instructions, the memory management processor 360 initiated opening of the memory pages where the contents of dataref were stored. As a result, when the instruction processor 304 reaches the instruction invoking dataref 540 (FIG. 5), the contents of dataref are already in the process of being retrieved, instead of that process beginning when the instruction processor 304 first reached the instruction 540 (FIG. 5) invoking the reference.

In fact, if a sufficient number of processing cycles pass between the time the memory management processor 360 (FIG. 3) initiates retrieval of the contents of dataref and the time the instruction processor 304 reaches the instruction invoking dataref, the memory management processor 360 might be able to substitute the value of dataref for the label dataref in the instruction 540 (FIG. 5), allowing the instruction to be processed without any memory latency delay. This would be possible if dataref happens to have been resident in level 1 cache 328 (FIG. 3) or level 2 cache 344, or otherwise enough time passed to allow dataref to be retrieved from main memory.

Figure 6:
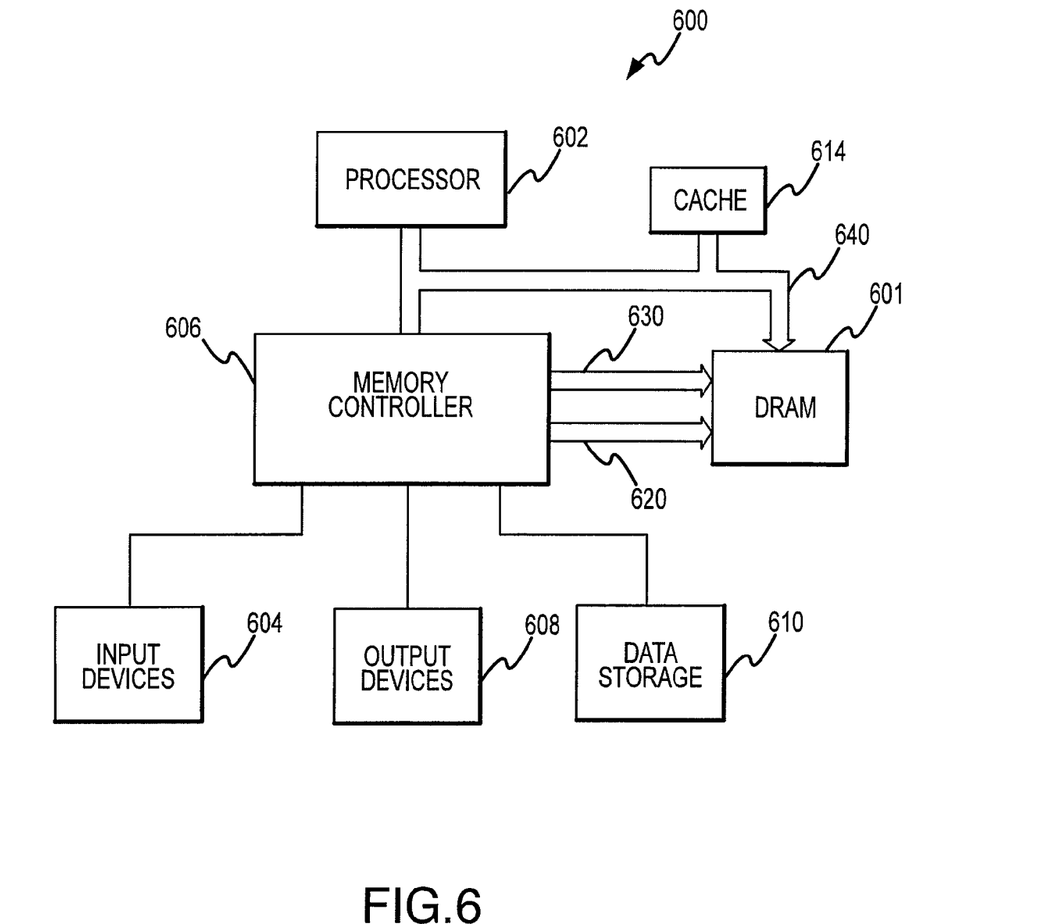
FIG. 6 is a block diagram of a computer system incorporating an embodiment of the present invention.

FIG. 6 is a block diagram of a computer system incorporating an embodiment of the present invention. In the computer system 600, a central processor 602 is adapted with a preferred embodiment of the present invention (not shown) as previously described. The computer system 600 including the DRAM 601 includes a central processor 602 for performing various functions, such as performing specific calculations or tasks. In addition, the computer system 600 includes one or more input devices 604, such as a keyboard or a mouse, coupled to the central processor 602 through a memory controller 606 and a processor bus 607 to allow an operator to interface with the computer system 600. Typically, the computer system 600 also includes one or more output devices 608 coupled with the central processor 602, such output devices typically being a printer or a video terminal. One or more data storage devices 610 are also typically coupled with the central processor 602 through the memory controller 606 to store data or retrieve data from external storage media (not shown). Examples of typical data storage devices 610 include hard and floppy disks, tape cassettes, and compact disk read-only memories (CD-ROMs). The DRAM 601 is typically coupled to the memory controller 606 through the control bus 620 and the address bus 630. The data bus 640 of the DRAM 601 is coupled to the processor 602 either directly (as shown) or through the memory controller 606 to allow data to be written to and read from the DRAM 601. The computer system 600 may also include a cache memory 614 coupled to the central processor 602 through the processor bus 607 to provide for the rapid storage and reading of data and/or instructions, as is well known in the art.

It is to be understood that, even though various embodiments and advantages of the present invention have been set forth in the foregoing description, the above disclosure is illustrative only. Changes may be made in detail, and yet remain within the broad principles of the invention. For example, a memory management processor could be external to the central processor, where it could receive and parse instructions before they reach the processor. This and other embodiments could make use of and fall within the principles of the invention.

The invention claimed is:

1. A method for managing memory, the method comprising:
   accessing a reference table contained in object code;
   determining whether an instruction in an execution pipeline references information in the reference table, wherein the reference table includes an indication of a memory location corresponding to the information;
   if the instruction references the information, initiating opening of the memory location corresponding to the information before executing the instruction.

2. The method of claim 1, wherein accessing the reference table comprises receiving the reference table.

3. The method of claim 1, wherein determining whether an instruction in the execution pipeline references information in the reference table comprises parsing the execution pipeline.

4. The method of claim 1, wherein the indication comprises an address in memory.

5. The method of claim 4, wherein initiating opening of the memory location comprises signaling a memory controller to retrieve information stored at the address.

6. The method of claim 4, wherein determining whether an instruction in an execution pipeline references information in the reference table comprises determining whether an instruction in an execution pipeline invokes a branch, routine call, and/or a data reference.

7. The method of claim 4, wherein the address comprises an offset address.

8. The method of claim 1, further comprising generating the reference table.

9. The method of claim 8, wherein generating the reference table comprises generating the reference table using a compiler.

10. The method of claim 9, wherein generating the reference table comprises generating the reference table using an assembler.

11. The method of claim 1, further comprising storing the reference table.

12. The method of claim 11, wherein storing the reference table comprises storing the reference table in a reference table buffer.

13. The method of claim 1, further comprising accessing a routine, wherein the reference table is accessed if the routine includes the reference table.

14. The method of claim 13, wherein accessing a routine comprises accessing a program.

15. The method of claim 1, wherein if the instruction references information in the reference table, looking up the indication of the memory location corresponding to the referenced information.

16. The method of claim 1, wherein initiating opening of the memory location comprises transmitting an address to a memory controller.

17. The method of claim 1, wherein determining whether an instruction in an execution pipeline references information in the reference table comprises determining whether an instruction queued in the execution pipeline invokes a reference in the reference table.

18. The method of claim 1, wherein the reference table precedes the instruction in the object code.

19. The method of claim 1, further comprising determining whether the reference table is a suitable reference table before accessing the reference table.

20. The method of claim 19, wherein determining whether the reference table is a suitable reference table comprises determining whether the reference table includes a signature.

21. The method of claim 1, wherein the instruction comprises a conditional branch instruction.

22. The method of claim 1, further comprising providing the table to the memory management processor.

23. The method of claim 1, further comprising loading instructions into the execution pipeline.

24. The method of claim 1, wherein accessing a reference table contained in object code comprises a memory management processor accessing the reference table.

25. The method of claim 1, wherein determining whether an instruction in an execution pipeline references information in the reference table comprises a memory management processor determining whether an instruction in an execution pipeline references information in the reference table.

26. The method of claim 1, wherein initiating opening of the memory location prior to executing the instruction comprises a memory management processor initiating opening of the memory location prior to executing the instruction.

27. The method of claim 1, wherein determining whether an instruction in the execution pipeline references information in the reference table comprises parsing instructions in the execution pipeline.

28. A method for managing memory, the method comprising:
    accessing a reference table contained in object code;
    determining whether an instruction in an execution pipeline references information in the reference table, wherein the reference table includes an indication of a memory location corresponding to the information;
    if the instruction references the information, initiating opening of the memory location corresponding to the information before executing the instruction; and
    retrieving the referenced information.

29. The method of claim 28, wherein retrieving the reference information comprises retrieving the referenced information from system memory.

30. The method of claim 28, wherein retrieving the referenced information comprises retrieving the referenced information from cache memory.

31. The method of claim 28, further comprising inserting the retrieved information into the execution pipeline.

32. The method of claim 31, wherein the referenced information comprises a variable, retrieving the referenced information comprises retrieving a value for a variable and inserting the retrieved referenced information comprises inserting the value of the variable in the instruction.

33. The method of claim 31, wherein retrieving the referenced information comprises retrieving instructions from a routine and wherein inserting the retrieved referenced information comprises inserting the retrieved instructions following the instruction that referenced the information.

34. A method for managing memory, the method comprising:
    accessing a reference table contained in object code;
    routing the reference table to a memory management processor;
    determining whether an instruction in an execution pipeline references information in the reference table, wherein the reference table includes an indication of a memory location corresponding to the information; and
    if the instruction references the information, initiating opening of the memory location corresponding to the information before executing the instruction.

35. The method of claim 34, further comprising signifying to a memory controller that the reference table should be routed to the memory management processor.

36. The method of claim 34, further comprising routing the reference table to the memory management processor as the object code is received by a processing unit that includes the memory management processor.

37. The method of claim 34, wherein routing the reference table to the memory management processor comprises a memory controller routing the reference table to the memory management processor.

* * * * *